United States Patent
Ho et al.

(10) Patent No.: US 8,400,416 B2
(45) Date of Patent: Mar. 19, 2013

(54) TRACK COMPENSATION METHODS AND SYSTEMS FOR TOUCH-SENSITIVE INPUT DEVICES

(75) Inventors: Chang-An Ho, Keelung (TW);
Ming-Hua Hsieh, Taipei County (TW);
Heng-Lin Pan, Taipei County (TW)

(73) Assignee: Industrial Technology Research Institute, Hsinchu (TW)

(*) Notice: Subject to any disclaimer, the term of this patent is extended or adjusted under 35 U.S.C. 154(b) by 250 days.

(21) Appl. No.: 12/950,189

(22) Filed: Nov. 19, 2010

(65) Prior Publication Data

US 2012/0026104 A1     Feb. 2, 2012

(30) Foreign Application Priority Data

Jul. 30, 2010   (TW) ................................ 99125303 A

(51) Int. Cl.
*G06F 3/041* (2006.01)

(52) U.S. Cl. ..................................... 345/173; 178/18.03

(58) Field of Classification Search ........................ None
See application file for complete search history.

(56) References Cited

U.S. PATENT DOCUMENTS

| | | | |
|---|---|---|---|
| 2006/0197753 A1* | 9/2006 | Hotelling | 345/173 |
| 2008/0096610 A1 | 4/2008 | Shin et al. | |
| 2009/0201246 A1* | 8/2009 | Lee et al. | 345/156 |
| 2010/0033431 A1* | 2/2010 | Ni et al. | 345/158 |
| 2010/0060593 A1* | 3/2010 | Krah | 345/173 |
| 2010/0279768 A1* | 11/2010 | Huang et al. | 463/31 |
| 2011/0292299 A1* | 12/2011 | Lau et al. | 348/734 |

* cited by examiner

*Primary Examiner* — Alexander S Beck
*Assistant Examiner* — Sejoon Ahn

(57) ABSTRACT

Track compensation methods and systems for touch-sensitive input devices are provided. First, a track corresponding to an input tool on a touch-sensitive device of an electronic device is detected. At least one motion attitude information corresponding to the touch-sensitive device is obtained. Then, the track is compensated for according to the at least one motion attitude information corresponding to the touch-sensitive device.

15 Claims, 4 Drawing Sheets

TRACK COMPENSATION METHODS AND SYSTEMS FOR TOUCH-SENSITIVE INPUT DEVICES

CROSS REFERENCE TO RELATED APPLICATIONS

This Application claims priority of Taiwan Patent Application No. 099125303, filed on Jul. 30, 2010, the entirety of which is incorporated by reference herein.

BACKGROUND

1. Field of the Disclosure

The disclosure relates generally to track compensation methods and systems for touch-sensitive input devices, and, more particularly to methods and systems that compensate for contact tracks, thus removing the influences due to vibrations.

2. Description of the Related Art

With increased usage of electronic devices, such as computers and portable devices, more and more applications and technologies have been developed for making these devices become more convenient.

Generally, a portable device may have related input devices, such that users can use the input devices to perform related inputs. For example, a portable device may be equipped with a touch-sensitive interface and/or a touch-sensitive display unit, and users can perform selections and inputs corresponding to related data, via the touch-sensitive interface/display unit. Based on a handwriting recognition mechanism, users can conveniently and speedily complete related inputs.

Since the portable device is not always placed on a stable desktop, the portable device may be frequently influenced by vibrations. For example, the portable device may be vibrated due to the movement of a hand holding the portable device, or due to the vibration of a transportation vehicle used by users. In some situations, when users perform related inputs via the touch-sensitive devices of the portable device, and the portable device is vibrated, the input data may be erroneous.

Currently, no mechanism is provided to perform related management for inputs when a portable device is vibrated. When the portable device vibrates, and an erroneous input occurs, users can only cancel the input, and re-perform related input operations. This is inconvenient for users. Additionally, performing additional related input operations also requires a large amount of resources, such as power of the portable device.

BRIEF SUMMARY

Track compensation methods and systems for touch-sensitive input devices are provided.

In an embodiment of a track compensation method for touch-sensitive input devices, a track corresponding to an input tool on a touch-sensitive device of an electronic device is detected. At least one motion attitude information corresponding to the touch-sensitive device is obtained. Then, the track is compensated for according to the at least one motion attitude information corresponding to the touch-sensitive device.

An embodiment of a track compensation system for touch-sensitive input devices includes a touch-sensitive device, a detecting unit and a processing unit. The touch-sensitive device detects a track corresponding to an input tool on the touch-sensitive device. The detecting unit detects at least one motion attitude information corresponding to the touch-sensitive device. The processing unit the track is compensates for according to the at least one motion attitude information corresponding to the touch-sensitive device.

In some embodiments, it is determined whether a disturbance condition has occurred in the touch-sensitive device according to the at least one motion attitude information corresponding to the touch-sensitive device. When the disturbance condition has occurred in the touch-sensitive device, the track is compensated for according to the at least one motion attitude information corresponding to the touch-sensitive device.

In some embodiments, the determination of whether a disturbance condition has occurred in the touch-sensitive device is performed by calculating a vibration amount corresponding to the touch-sensitive device according to the at least one motion attitude information, and determining whether the vibration amount is greater than a predefined threshold value. When the vibration amount is greater than the predefined threshold value, it is determined that the disturbance condition has occurred in the touch-sensitive device. In some embodiments, the predefined threshold value can be determined according to an average vibration amount corresponding to the touch-sensitive device within a predefined period. In some embodiments, the predefined threshold value can be determined according to a human factor adjustment ratio.

In some embodiments, it is determined whether the vibration amount is greater than a predefined scale of the predefined threshold value. When the vibration amount is greater than the predefined scale of the predefined threshold value, the compensation for the track is cancelled.

In some embodiments, a space vibration vector corresponding to the touch-sensitive device is calculated according to the at least one motion attitude information. The space vibration vector is transformed into a two-dimensional deviation vector according to a coordination transformation matrix. The track is compensated for according to the two-dimensional deviation vector.

Track compensation methods for touch-sensitive input devices may take the form of a program code embodied in a tangible media. When the program code is loaded into and executed by a machine, the machine becomes an apparatus for practicing the disclosed method.

BRIEF DESCRIPTION OF THE DRAWINGS

The disclosure will become more fully understood by referring to the following detailed description with reference to the accompanying drawings, wherein.

DETAILED DESCRIPTION

Track compensation methods and systems for touch-sensitive input devices are provided.

Figure 1:
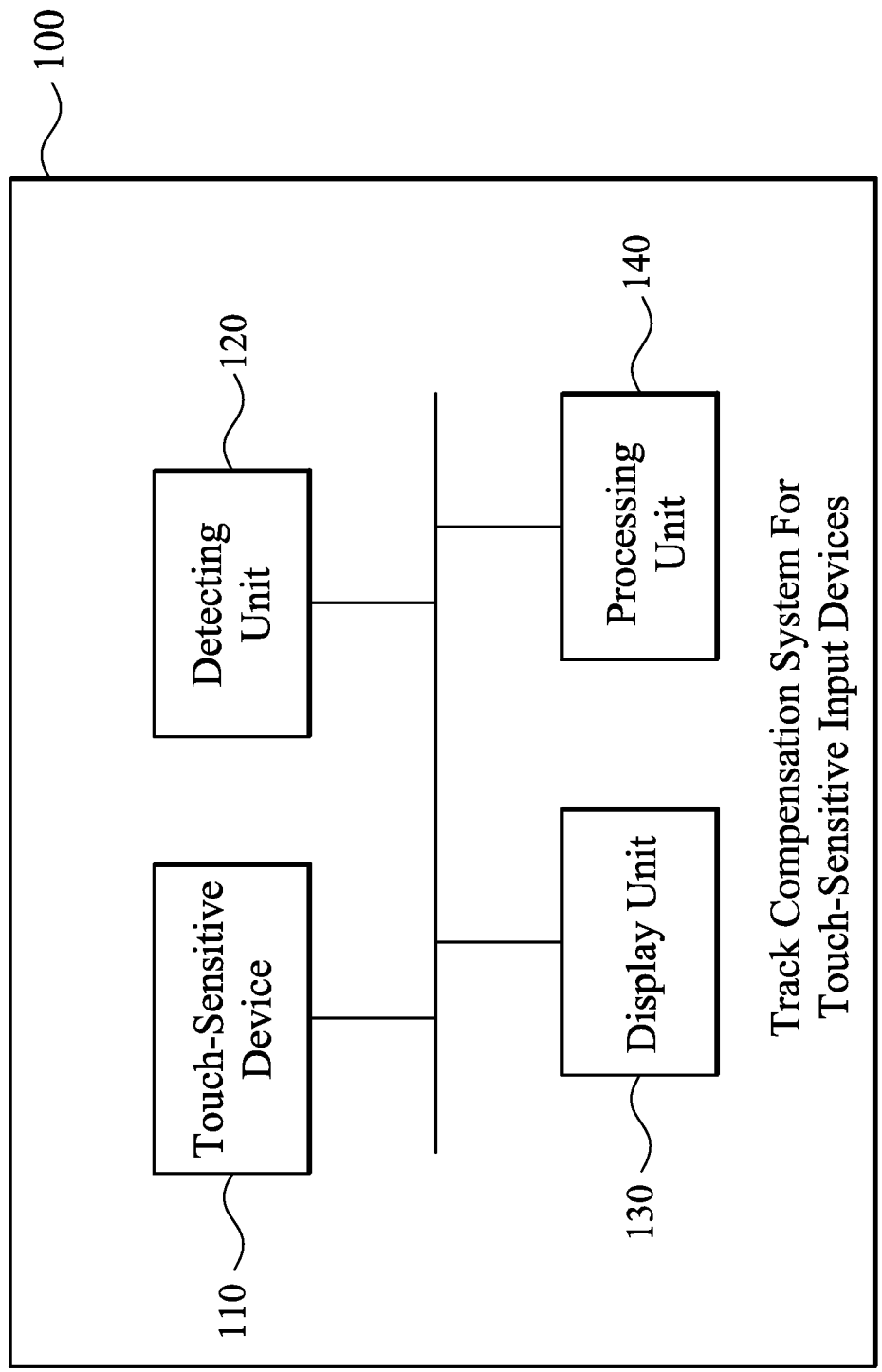
FIG. 1 is a schematic diagram illustrating an embodiment of a track compensation system for touch-sensitive input devices.

FIG. 1 is a schematic diagram illustrating an embodiment of a track compensation system for touch-sensitive input devices of the invention. The track compensation system for touch-sensitive input devices 100 may be for a processor-based electronic device, such as a computer or a portable device.

The track compensation system for touch-sensitive input devices 100 comprises a touch-sensitive device 110, a detecting unit 120, a display unit 130, and a processing unit 140. The touch-sensitive device 110 has a touch-sensitive surface comprising at least one one sensor to detect contact and movement of an input tool, such as a stylus or finger on the touch-sensitive surface. The detecting unit 120 can detect the motion attitude information of the touch-sensitive device 110. It is noted that, the motion attitude information of the touch-sensitive device 110 may be a three-dimensional space coordinate. The display unit 130 can display the contact, movement, and/or tracks corresponding to the input tool, detected by the touch-sensitive device 110. Additionally, the display unit 130 can also display related data, and/or related figures and interfaces. It is understood that, in some embodiments, the touch-sensitive device 110 and the display unit 130 can be integrated as a touch-sensitive display unit. That is, users can use the touch-sensitive display unit to input related data, and review related data via the touch-sensitive display unit. The processing unit 140 performs the track compensation method for touch-sensitive input devices of the invention, which will be discussed further in the following paragraphs.

Figure 2:
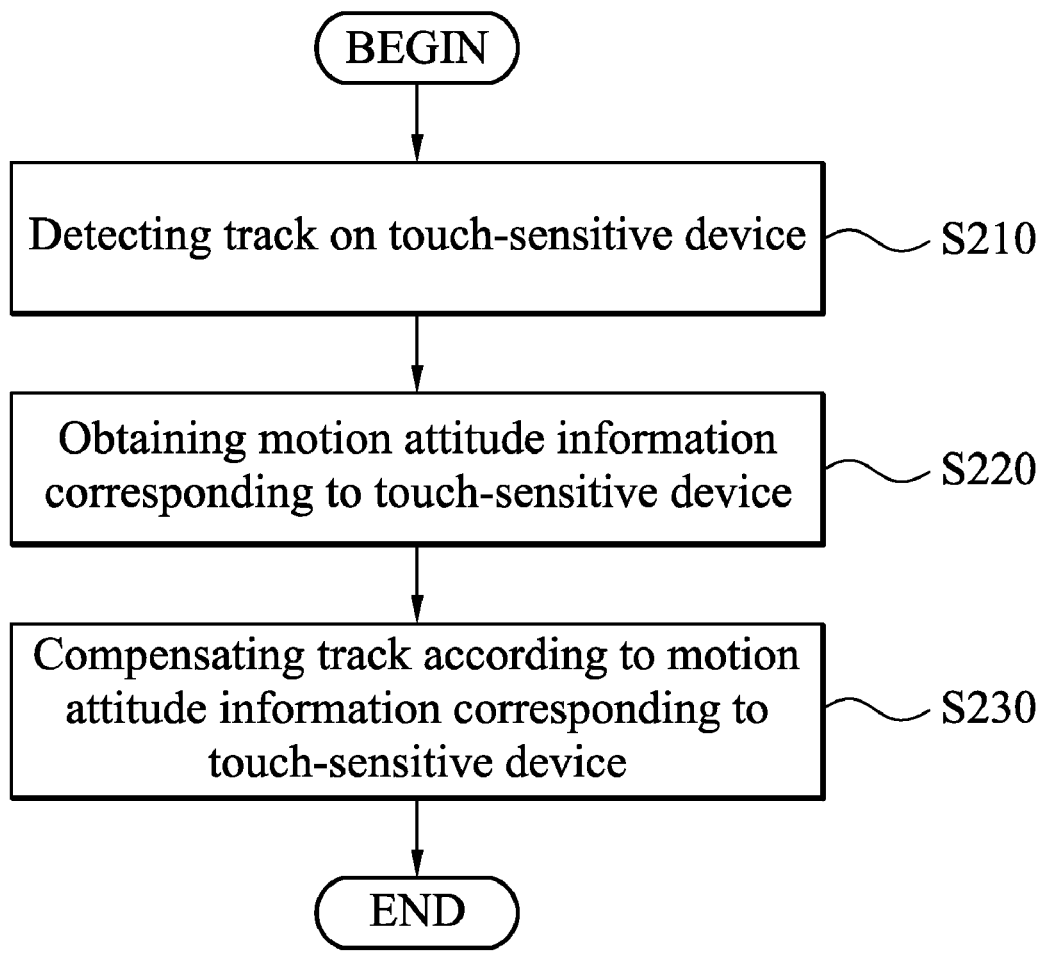
FIG. 2 is a flowchart of an embodiment of a track compensation method for touch-sensitive input devices.

FIG. 2 is a flowchart of an embodiment of a track compensation method for touch-sensitive input devices of the invention. The track compensation method for touch-sensitive input devices can be used in a processor-based electronic device, such as a computer or a portable device.

In step S210, a track corresponding to an input tool on the touch-sensitive device 110 is detected. In step S220, at least one motion attitude information corresponding to the touch-sensitive device 110 is obtained from the detecting unit 120. As described, the motion attitude information corresponding to the touch-sensitive device 110 may be a three-dimensional space coordinate. After the track on the touch-sensitive device 110 and the motion attitude information corresponding to the touch-sensitive device 110 are obtained, in step S230, the track is compensated for according to the at least one motion attitude information corresponding to the touch-sensitive device 110. In some embodiments, the compensated track can be displayed via the display unit 130.

It is understood that, in some embodiments, the track can be compensated for according to the following equation:

$$CL_n = L_n - P[n] + e,$$

wherein $CL_n$ is the compensated track, $$L_n = \begin{bmatrix} x[n] \\ y[n] \end{bmatrix},$$

which is the current track on the touch-sensitive device 110, wherein (x, y) is a coordinate of a contact on the touch-sensitive device 110, e is an error, which can be adjusted according to various requirements and applications, $P[n] = T_{\{\theta,\Phi,\phi\}} M[n]$, wherein $$P[n] = \begin{bmatrix} x[n] - x[n-1] \\ y[n] - y[n-1] \end{bmatrix},$$

which is a two-dimensional deviation vector corresponding to the vibration of the touch-sensitive device 110, $T_{\{\theta,\Phi,\phi\}}$ is a coordination transformation matrix for transforming 3D coordinates to 2D coordinates, $$M[n] = \begin{bmatrix} u[n] - u[n-1] \\ v[n] - v[n-1] \\ w[n] - w[n-1] \end{bmatrix},$$

which are the space vibration vectors of the touch-sensitive device 110 at time step n−1 to n, wherein (u, v, w) is the space coordinate of a contact.

That is, the motion attitude information corresponding to the touch-sensitive device 110 at succeeding time steps, such as time step n−1 and time step n can be first used to calculate the space vibration vectors M[n] corresponding to the touch-sensitive device 110. Then, the space vibration vectors M[n] can be transformed into the two-dimensional deviation vector P[n] according to the coordination transformation matrix $T_{\{\theta,\Phi,\phi\}}$. Finally, the current track L[n] on the touch-sensitive device 110 can be compensated for as $CL_n$ according to the two-dimensional deviation vector P[n].

It is noted that, the mentioned equation is a representative form of digital signals after sampling of successive signals. Additionally, the above equation is only an example of the embodiment, and the invention is not limited thereto.

Figure 3:
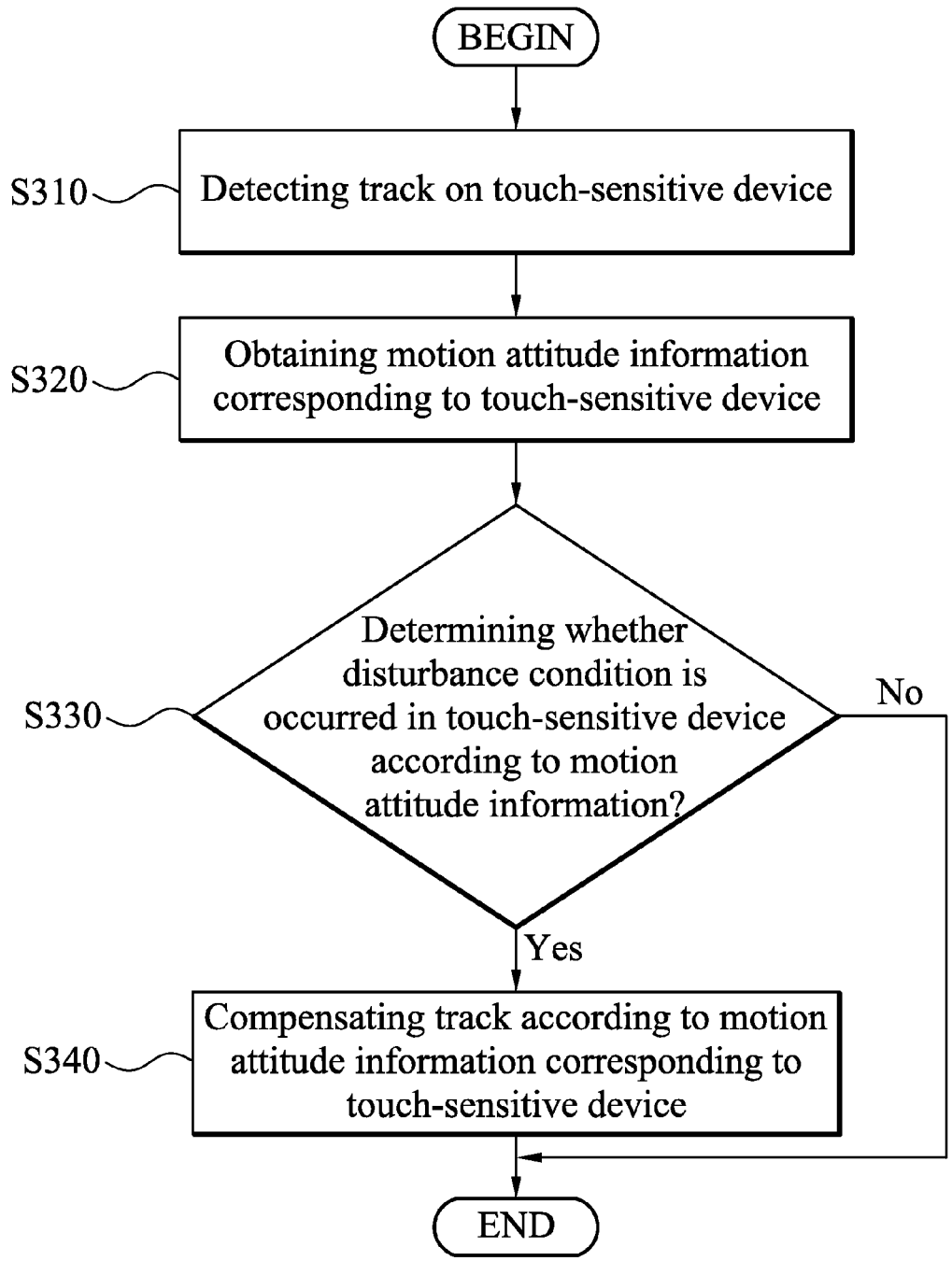
FIG. 3 is a flowchart of another embodiment of a track compensation method for touch-sensitive input devices.

FIG. 3 is a flowchart of another embodiment of a track compensation method for touch-sensitive input devices of the invention. The track compensation method for touch-sensitive input devices can be used in a processor-based electronic device, such as a computer or a portable device.

In step S310, a track corresponding to an input tool on the touch-sensitive device 110 is detected. In step S320, at least one motion attitude information corresponding to the touch-sensitive device 110 is obtained from the detecting unit 120. As described, the motion attitude information corresponding to the touch-sensitive device 110 may be a three-dimensional space coordinate. In step S330, it is determined whether a specific disturbance condition has occurred in the touch-sensitive device 110 according to the motion attitude information corresponding to the touch-sensitive device 110. It is noted that, in some embodiments, the specific disturbance condition means a disturbance condition which is greater than that of a first predefined level. For example, a slight disturbance (such as a disturbance which is less than that of the first predefined level) will not result in the specific disturbance condition. Additionally, in some embodiments, the specific disturbance condition means a disturbance condition which is less than a second predefined level. For example, an excessively large disturbance (such as a disturbance which is greater than that of the second predefined level) will not result in the specific disturbance condition.

Figure 4:
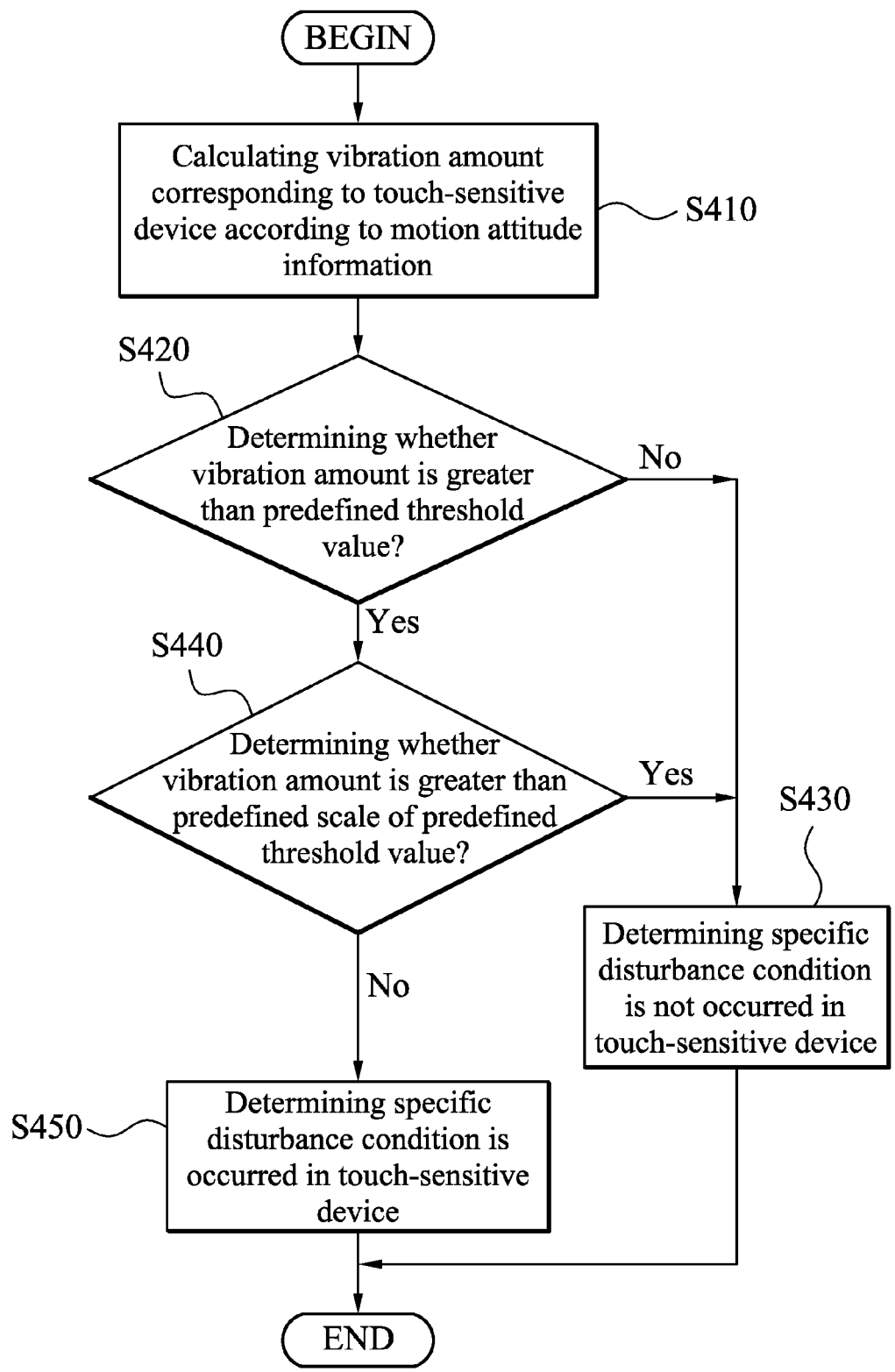
FIG. 4 is a flowchart of an embodiment of a method for determining whether a disturbance condition has occurred in the touch-sensitive device.

FIG. 4 is a flowchart of an embodiment of a method for determining whether a disturbance condition has occurred in the touch-sensitive device. In step S410, a vibration amount corresponding to the touch-sensitive device 110 is calculated according to the motion attitude information of the touch-sensitive device 110. In some embodiments, the motion attitude information corresponding to the touch-sensitive device 110 at two succeeding time steps, such as time step n−1 and time step n can be used to calculate the space vibration vectors M[n] corresponding to the touch-sensitive device 110. The space vibration vectors M[n] can be transformed into the vibration amount according to the following equation:

$V[n] = M^T[n]M[n]$ wherein V [n] is the vibration amount corresponding to the touch-sensitive device 110. In step S420, it is determined whether the vibration amount corresponding to the touch-sensitive device 110 is greater than a predefined threshold value. It is understood that, in some embodiments, the predefined threshold value may be a fixed value. In some embodiments, the predefined threshold value can be determined according to an average vibration amount corresponding to the touch-sensitive device 110 within a predefined period. Additionally, in some embodiments, the predefined threshold value can be determined based on an average vibration amount corresponding to the touch-sensitive device 110 within a predefined period and a human factor adjustment ratio according to the following equation:

$$V_{threshold} = V_{mean} \times (1+S_t),$$

wherein $V_{threshold}$ is the predefined threshold value, $$V_{mean} = \frac{\sum_{n=m}^{k+m} V[n]}{k+1},$$

which is the average vibration amount corresponding to the touch-sensitive device 110 within the predefined period, wherein the number of vibration amounts which can be obtained from the predefined period is (k+1), and $S_t$ is the human factor adjustment ratio, which can be adjusted according to various requirements and applications.

When the vibration amount corresponding to the touch-sensitive device 110 is not greater than the predefined threshold value (No in step S420), in step S430, it is determined that the specific disturbance condition has not occurred in the touch-sensitive device 110. It is understood that, in some cases, a slight disturbance may have occurred in the touch-sensitive device 110, and however, the disturbance level is not enough to influence the input behavior of users. Therefore, it is determined that the specific disturbance condition has not occurred in the touch-sensitive device 110, and the compensation process is not necessary. When the vibration amount corresponding to the touch-sensitive device 110 is greater than the predefined threshold value (Yes in step S420), in step S440, it is determined whether the vibration amount corresponding to the touch-sensitive device 110 is greater than a predefined scale of the predefined threshold value. For example, the predefined threshold value multiplied by a maximum vibration compensation tolerance rate. It is understood that, the maximum vibration compensation tolerance rate can be set and adjusted according to various requirements and applications. When the vibration amount corresponding to the touch-sensitive device 110 is greater than the predefined scale of the predefined threshold value (Yes in step S440), in step S430 it is determined that the specific disturbance condition has not occurred in the touch-sensitive device 110. It is understood that, in some cases, an excessively large disturbance may have occurred in the touch-sensitive device 110. Since the disturbance level may seriously influence the input behavior of users, which may go beyond the available compensation range, therefore, it is determined that the specific disturbance condition has not occurred in the touch-sensitive device 110, and the compensation process is not necessary. It is noted that, in some embodiments, when the vibration amount corresponding to the touch-sensitive device 110 is greater than the predefined scale of the predefined threshold value, the track can be cancelled (deleted). Users will input another track on the touch-sensitive device 110 when no track can be seen. When the vibration amount corresponding to the touch-sensitive device 110 is not greater than the predefined scale of the predefined threshold value (No in step S440), in step S450, it is determined that the specific disturbance condition has occurred in the touch-sensitive device 110. It is understood that, step S440 can be omitted in some embodiments.

Referring to FIG. 3 again, when the specific disturbance condition has not occurred in the touch-sensitive device 110 (No in step S330), the procedure is completed. When the specific disturbance condition has occurred in the touch-sensitive device 110 (Yes in step S330), in step S340, the track is compensated for according to the motion attitude information corresponding to the touch-sensitive device 110. In some embodiments, the compensated track can be displayed via the display unit 130.

Similarly, in some embodiments, the track can be compensated for according to the following equation:

$$CL_n = L_n - P[n] + e$$

wherein $CL_n$ is the compensated track, $$L_n = \begin{bmatrix} x[n] \\ y[n] \end{bmatrix},$$

which is the current track on the touch-sensitive device 110, wherein (x, y) is a coordinate of a contact on the touch-sensitive device 110, e is an error, which can be adjusted according to various requirements and applications, $P[n] = T_{\{\theta,\Phi,\phi\}} M[n]$ wherein $$P[n] = \begin{bmatrix} x[n] - x[n-1] \\ y[n] - y[n-1] \end{bmatrix},$$

which is a two-dimensional deviation vector corresponding to the vibration of the touch-sensitive device 110, $T_{\{\theta,\Phi,\phi\}}$ is a coordination transformation matrix for transforming 3D coordinates to 2D coordinates, $$M[n] = \begin{bmatrix} u[n] - u[n-1] \\ v[n] - v[n-1] \\ w[n] - w[n-1] \end{bmatrix},$$

which are the space vibration vectors of the touch-sensitive device 110 at time step n−1 to n, wherein (u, v, w) is the space coordinate of a contact.

Therefore, the track compensation methods and systems for touch-sensitive input devices can compensate for tracks according to the motion attitude information corresponding to the touch-sensitive device, to remove vibration influences to the tracks.

The track compensation methods for touch-sensitive input devices, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A track compensation method for touch-sensitive input devices, for use in an electronic device comprising a touch-sensitive device, comprising:
   detecting a track corresponding to an input tool on the touch-sensitive device;
   obtaining at least one motion attitude information corresponding to the touch-sensitive device; and
   compensating the track according to the at least one motion attitude information corresponding to the touch-sensitive device, wherein the compensation of the track according to the at least one motion attitude information determination comprises the steps of:
     calculating a space vibration vector corresponding to the touch-sensitive device according to the at least one motion attitude information;
     transforming the space vibration vector into a two-dimensional deviation vector according to a coordinate transformation matrix; and
     compensating the track according to the two-dimensional deviation vector according to the following equation:

$$CL_n = L_n - P[n] + e,$$

wherein $CL_n$ is the compensated track, $$L_n = \begin{bmatrix} x[n] \\ y[n] \end{bmatrix},$$

which is the current track on the touch-sensitive device, wherein (x, y) is a coordinate of a contact on the touch-sensitive device, e is an error, and P[n] is the two-dimensional deviation vector.

2. The method of claim 1, further comprising:
   determining whether a disturbance condition has occurred in the touch-sensitive device according to the at least one motion attitude information; and
   when the disturbance condition has occurred in the touch-sensitive device, compensating the track according to the at least one motion attitude information.

3. The method of claim 2, wherein the determination of whether the disturbance condition has occurred in the touch-sensitive device comprises the steps of:
   calculating a vibration amount corresponding to the touch-sensitive device according to the at least one motion attitude information;
   determining whether the vibration amount is greater than a predefined threshold value; and
   when the vibration amount is greater than the predefined threshold value, determining that the disturbance condition has occurred in the touch-sensitive device.

4. The method of claim 3, wherein the predefined threshold value is determined according to an average vibration amount corresponding to the touch-sensitive device within a predefined period.

5. The method of claim 4, wherein the predefined threshold value is determined further according to a human factor adjustment ratio.

6. The method of claim 3, further comprising:
   determining whether the vibration amount is greater than a predefined scale of the predefined threshold value; and
   when the vibration amount is greater than the predefined scale of the predefined threshold value, canceling the compensation for the track.

7. The method of claim 1, further comprising displaying the compensated track.

8. A track compensation system for touch-sensitive input devices, comprising:
   a touch-sensitive device detecting a track corresponding to an input tool on the touch-sensitive device;
   a detecting unit obtaining at least one motion attitude information corresponding to the touch-sensitive device; and
   a processing unit compensating the track according to the at least one motion attitude information corresponding to the touch-sensitive device, wherein the compensation of the track according to the at least one motion attitude information determination comprises the steps of:
     calculating a space vibration vector corresponding to the touch-sensitive device according to the at least one motion attitude information;
     transforming the space vibration vector into a two-dimensional deviation vector according to a coordination transformation matrix; and
     compensating the track according to the two-dimensional deviation vector according to the following equation:

$$CL_n = L_n - P[n] + e,$$

wherein $CL_n$ is the compensated track, $$L_n = \begin{bmatrix} x[n] \\ y[n] \end{bmatrix},$$

which is the current track on the touch-sensitive device, wherein (x, y) is a coordinate of a contact on the touch-sensitive device, e is an error, and P[n] is the two-dimensional deviation vector.

9. The system of claim 8, wherein the processing unit further determines whether a disturbance condition has occurred in the touch-sensitive device according to the at least one motion attitude information, and when the disturbance condition has occurred in the touch-sensitive device, the track is compensates for according to the at least one motion attitude information.

10. The system of claim 9, wherein the processing unit calculates a vibration amount corresponding to the touch-sensitive device according to the at least one motion attitude information, determines whether the vibration amount is greater than a predefined threshold value, and when the vibration amount is greater than the predefined threshold value, determines that the disturbance condition has occurred in the touch-sensitive device.

11. The system of claim 10, wherein the predefined threshold value is determined according to an average vibration amount corresponding to the touch-sensitive device within a predefined period.

12. The system of claim 11, wherein the predefined threshold value is determined further according to a human factor adjustment ratio.

13. The system of claim 10, wherein the processing unit further determines whether the vibration amount is greater than a predefined scale of the predefined threshold value, and when the vibration amount is greater than the predefined scale of the predefined threshold value, canceling the compensation for the track.

14. The system of claim 8, further comprising a display unit, and the processing unit further displays the compensated track via the display unit.

15. A non-transitory machine-readable storage medium comprising a computer program, which, when executed, causes a device to perform a track compensation method for touch-sensitive input devices, wherein the method comprises:
  detecting a track corresponding to an input tool on a touch-sensitive device;
  obtaining at least one motion attitude information corresponding to the touch-sensitive device; and
  compensating the track according to the at least motion attitude information corresponding to the touch-sensitive device, wherein the compensation of the track according to the at least one motion attitude information determination comprises the steps of:
    calculating a space vibration vector corresponding to the touch-sensitive device according to the at least one motion attitude information;
    transforming the space vibration vector into a two-dimensional deviation vector according to a coordination transformation matrix; and
    compensating the track according to the two-dimensional deviation vector according to the following equation:

$$CL_n = L_n - P[n] + e,$$

wherein $CL_n$ is the compensated track, $$L_n = \begin{bmatrix} x[n] \\ y[n] \end{bmatrix},$$

which is the current track on the touch-sensitive device, wherein (x, y) is a coordinate of a contact on the touch-sensitive device, e is an error, and P[n] is the two-dimensional deviation vector.

* * * * *